United States Patent [19]
Smith

[11] Patent Number: 4,991,005
[45] Date of Patent: Feb. 5, 1991

[54] GLASS FRAME VIEWING ASSEMBLY AND METHOD OF USE

[76] Inventor: Ethel L. Smith, Box 1988, Colorado Springs, Colo. 80901

[21] Appl. No.: 427,518

[22] Filed: Oct. 27, 1989

[51] Int. Cl.$^5$ .......................... H04N 7/18; H04N 5/76
[52] U.S. Cl. ...................................... 358/93; 358/335; 358/108; 434/371
[58] Field of Search ................. 358/93, 335, 183, 108; 434/371

[56] References Cited

U.S. PATENT DOCUMENTS

| | | | |
|---|---|---|---|
| 2,899,860 | 8/1959 | Scott et al. | 434/371 |
| 3,044,187 | 7/1962 | Nicholls | 434/371 |
| 3,047,966 | 8/1962 | Greenspan | 434/371 |
| 4,232,334 | 11/1980 | Dyson | 358/93 |
| 4,261,012 | 4/1981 | Maloomian | 358/93 |
| 4,297,724 | 10/1981 | Masuda et al. | 358/93 |
| 4,467,349 | 8/1984 | Maloomian | 358/181 |
| 4,539,585 | 9/1985 | Spackova et al. | 358/93 |
| 4,602,280 | 7/1986 | Maloomian | 358/93 |
| 4,688,105 | 8/1987 | Bloch et al. | 358/335 |
| 4,730,260 | 3/1988 | Mori et al. | 358/93 |
| 4,731,743 | 3/1988 | Blancato | 358/93 |
| 4,821,118 | 4/1989 | Lafreniere | 358/93 |
| 4,841,378 | 6/1989 | Cogert | 358/335 |

Primary Examiner—John K. Peng
Attorney, Agent, or Firm—Phillip A. Rein

[57] ABSTRACT

This invention relates to a glass frame viewing assembly usable to record various images of an operator trying on numerous glass frames in order to make an intelligent and visual decision of the ones desired for purchase. The glass frame viewing assembly includes an operator booth assembly having a support table member and an adjacent operator support chair member and enclosed by front, side and screen wall members in order to provide privacy to the operator using same. The glass frame viewing assembly includes a video taping assembly interconnected to a video display assembly and all controlled through a main control panel assembly. The main control panel assembly is operable through a VCR control switch assembly to control the video taping assembly for later display of a recording operation on the video display assembly for observation of the operator thereon. The glass frame viewing assembly allows the operator to try on numerous glass frames and record same in various front and side views for later observing same while the operator is wearing its own prescription eyeglasses in order to more clearly view the numerous glass frames and make an intelligent decision as to which glass frame is desirable to wear and purchase.

5 Claims, 2 Drawing Sheets

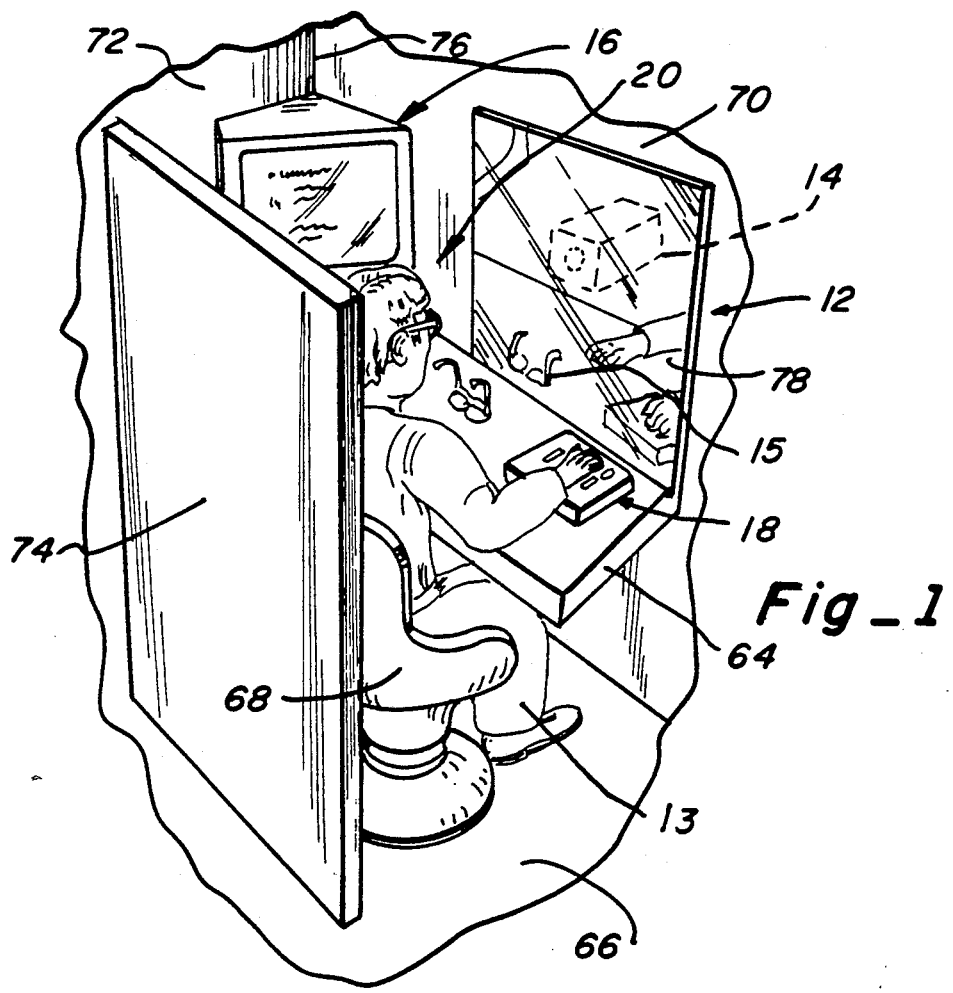
Fig_1
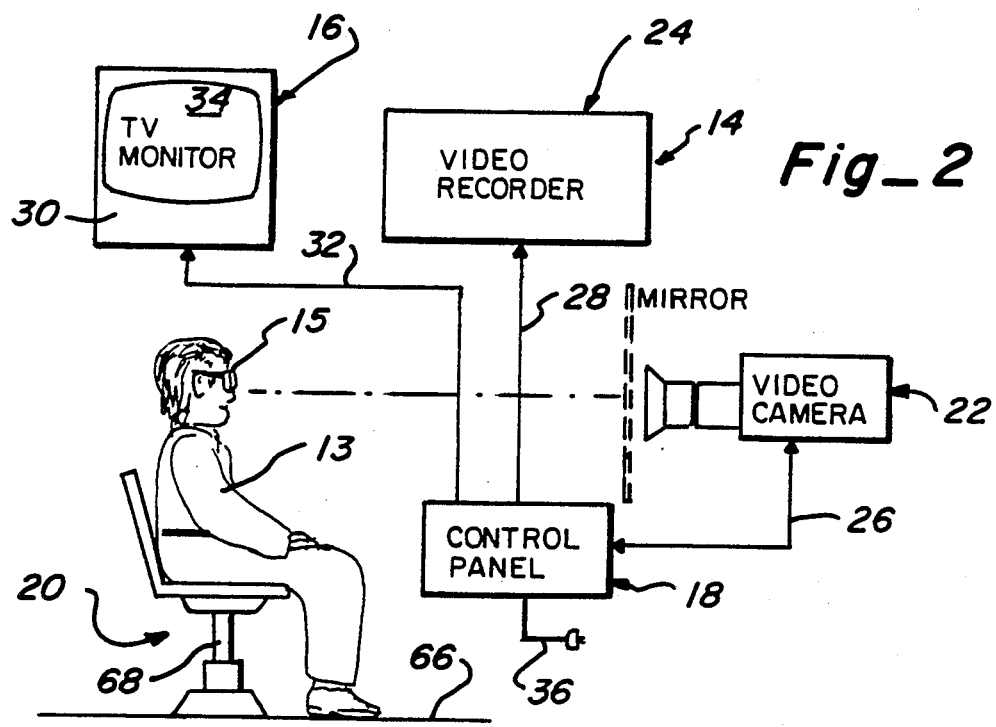
Fig_2

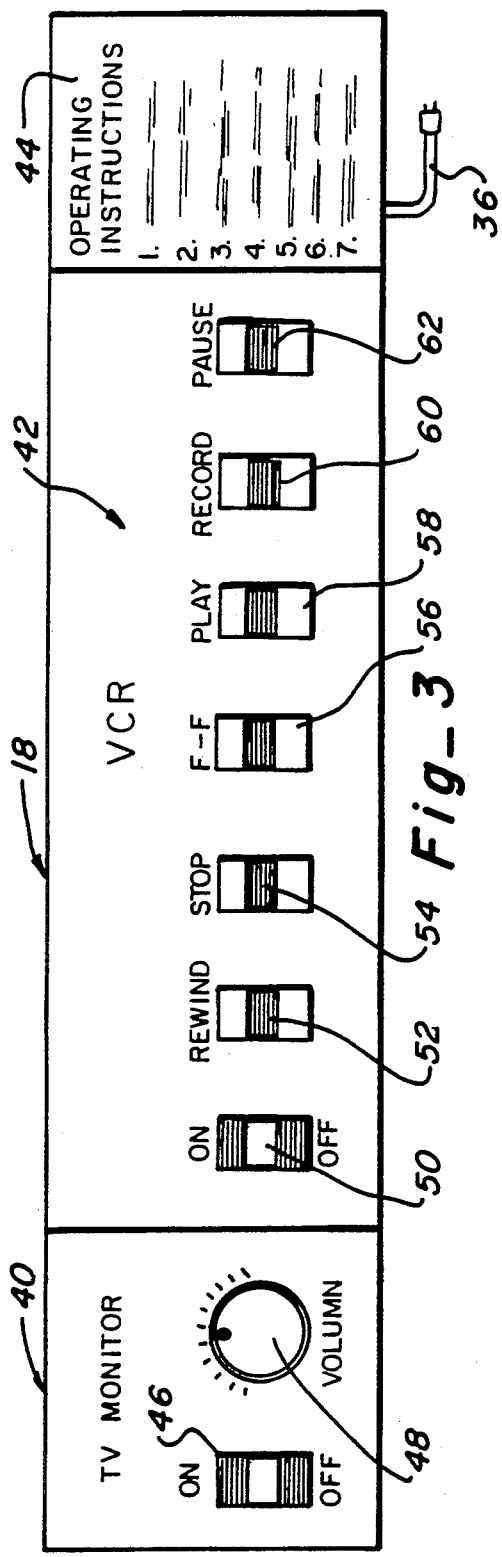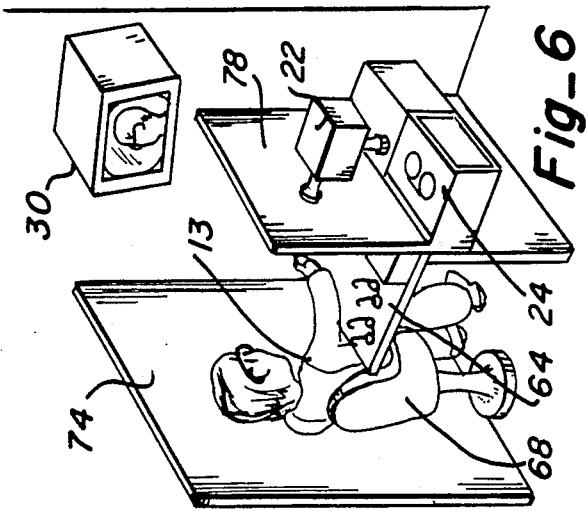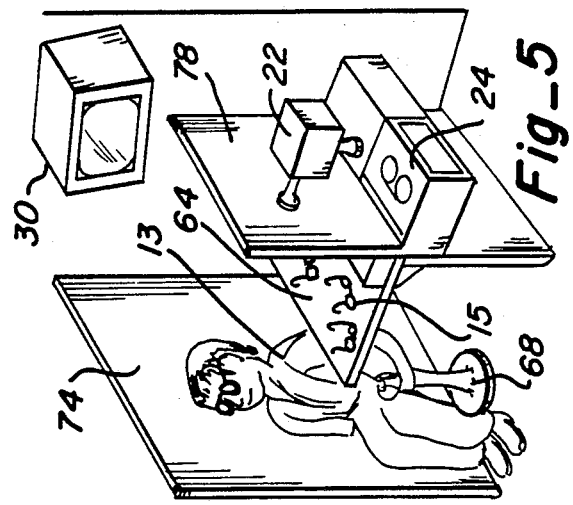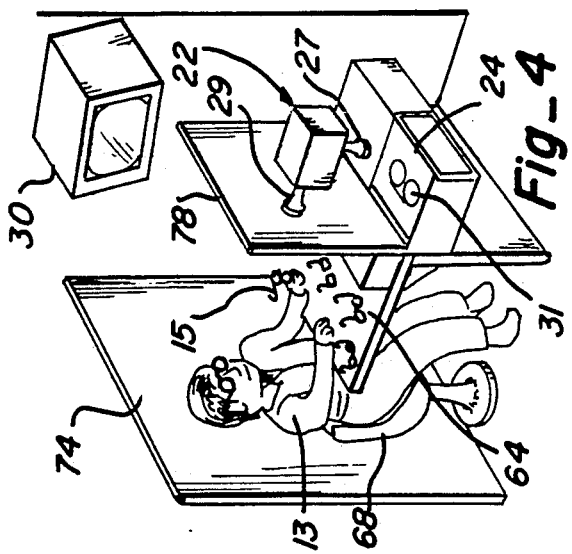

GLASS FRAME VIEWING ASSEMBLY AND METHOD OF USE

PRIOR ART

A patent search on this invention revealed the following United States Patents:

| U.S. Pat. No. | Invention | Inventor |
|---|---|---|
| 2,899,860 | FASHION PREVIEWING PROJECTOR | A. D. Scott et al |
| 3,044,187 | DISPLAY DEVICE | Thomas C. Nicholls, Jr. |
| 3,047,966 | WINDOW DISPLAY APPARATUS | George M. Greenspan |
| 4,232,334 | COSMETIC APPARATUS AND METHOD | Evelyna O. Dyson |
| 4,261,012 | SYSTEM AND METHOD FOR COMPOSITE DISPLAY | Laurence G. Maloomian |
| 4,297,724 | METHOD AND MACHINE FOR TRYING ON A HAIR FORM IN IMAGE | Masuda et al |
| 4,467,349 | SYSTEM AND METHOD FOR COMPOSITE DISPLAY | Laurence G. Maloomian |
| 4,539,585 | PREVIEWER | Spackova et al |
| 4,602,280 | WEIGHT AND/OR MEASUREMENT REDUCTION PREVIEW SYSTEM | Laurence G. Maloomian |
| 4,731,743 | METHOD AND APPARATUS FOR DISPLAYING HAIRSTYLES | Vito Blancato |

ANALYSIS

The Scott et al patent discloses a fashion previewing projector to display a hair style image to the customer.

The Nicholls, Jr. patent discloses the use of a mirror structure and a manikin having wearing apparel thereon disposed between the customer and the mirror in order to present an image of how the apparel would look on the customer.

The Greenspan patent discloses a window display apparatus for eyeglasses whereupon the eyeglass frames are selectively rotated between the user in the mirror and the combined images are viewed by the customer.

The Dyson patent discloses the use of a video camera system in order to project the appearance of a person with cosmetics applied thereto.

The Maloomian patents ('012 and '349) and the Spackova et al patent disclose the use of video cameras and clothing structures to project an image on a television monitor of the customer and projecting how the clothing would look thereon.

The Maloomian U.S. Pat. No. 4,602,280 discloses the use of a video camera and computer structure plus software in order to illustrate the customer's present weight image as displayed side-by-side with the proposed image after a loss of weight.

The Masuda et el and Blancato patents disclose method and apparatus for compositing a subject with a hair image and utilizing video camera structures.

PREFERRED EMBODIMENT OF THE INVENTION

In one preferred embodiment of this invention, a glass frame viewing assembly is provided which is utilized by a person wanting to purchase eyeglasses and/or a glass frame in an optometrist's office or optical eyeglass store and being used to try on various glass frames to find one of best fit and appearance for purchase. The glass frame viewing assembly includes (1) a video taping assembly; (2) a video display assembly such as a television monitor assembly; (3) a main control panel assembly to regulate the use and operation of the interconnected video taping assembly and video display assembly; and (4) an operator booth assembly to enclose a customer or operator of the aforementioned equipment. The video taping assembly includes a video camera assembly interconnected to a video recorder assembly operable to tape the operator while trying on various glass frames and record the same on a video cassette member. The video display assembly includes a television monitor assembly to display from the video cassette member the operator trying on the various glass frames. The main control panel assembly includes a plurality of control members operable to control operation of the video display assembly and the video taping assembly placed in easy reach of the operator. The operator booth assembly includes (1) a main support table; (2) a support chair member adjacent the support table member to support the operator thereon and having an enclosure with front, side, and screen wall members; and (3) a main display mirror member in which the operator can observe its image while trying on the glass frames. At this time, the operator is taping the various eyeglass frame images for later playback when the operator can put on its own prescription glasses for proper viewing and choosing of a desired eyeglass frame.

OBJECTS OF THE INVENTION

One object of this invention is to provide a glass frame viewing assembly to be used by an operator to try on a plurality of glass frames utilizing a video taping assembly and a video display assembly whereupon the operator can view numerous glass frames and record same on the video equipment from various angles thereby being able to later play back with the video equipment to observe how the glass frames appear on the operator's head portion with the operator wearing his or her own prescription eyeglasses in order to evaluate which glass frame would appear to be most desirable.

Another object of this invention is to provide a glass frame viewing assembly having a video taping assembly interconnected to a video display assembly and controlled through a main control panel assembly, all enclosed within a privacy type operator booth assembly for the purpose of trying on, viewing, and evaluating glass frames for the purchase thereof.

One other object of this invention is to provide a glass frame viewing assembly enabling the opertor thereof to try on numerous glass frames and record same through a video taping and display assembly so that the operator can view the numerous glass frames from various angles and review same while using his or her own prescription eyeglasses due to the recording of same on a video cassette member.

One further object of this invention is to provide a glass frame viewing assembly provided with a video taping means within an operator booth assembly and achieving a new and novel method of viewing and evaluating glass frames by the operator in the privacy of the operator booth assembly.

Still, one other object of this invention is to provide a glass frame viewing assembly which is compact in size; economical to manufacture; easy to use; and provides numerous customer satisfaction features.

Various other objects, advantages, and features of the invention will become apparent to those skilled in the art from the following discussion, taken in conjunction with the accompanying drawings, in which:

FIGURES OF THE INVENTION

FIG. 1 is a perspective view of a glass frame viewing assembly of this invention having an operator utilizing same;

FIG. 2 is a side elevational schematic view illustrating the glass frame viewing assembly of this invention;

FIG. 3 is an enlarged front elevational view illustrating a main control panel assembly of this invention; and FIGS. 4, 5, and 6 are perspective schematic views illustrating the use and operation of the glass frame viewing assembly of this invention.

The following is a discussion and description of preferred specific embodiments of the glass frame viewing assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a glass frame viewing assembly of this invention, indicated generally at 12, is shown as being utilized by an operator 13 in the process of evaluating a plurality of glass frames 15 in order to determine which pair would be most appealing and desirable for purchase.

The glass frame viewing assembly 12 includes (1) a video taping assembly 14; (2) a video display assembly 16 interconnected to the video taping assembly 14; (3) a main control panel assembly 18 interconnected to the video display assembly 16 and the video taping assembly 14; and (4) an operator booth assembly 20 used to receive and enclose the operator 13 while viewing and displaying the glass frames 15 in order to make a proper choice for wear and purchase.

The video taping assembly 14 includes a video camera assembly 22 interconnected to a video recorder assembly 24. The video camera assembly 22 includes a video cable member 26 to supply operating power from the main control panel assembly 18, a pedestal 27 for support, and a camera lens member 29. The video camera assembly 22 is operable as a conventional video camera member operable to selectively view and record images as will be described.

The video recorder assembly 24 is of a conventional nature supplied with power through a recorder cable member 28 from the main control panel assembly 18 and operable to record images from the video camera assembly 22 on a video cassette member 31 in a conventional manner.

The video display assembly 16 includes a television monitor assembly 30 similar to a conventional television set and interconnected by a display cable member 32 to the main control panel assembly 18. The television monitor assembly 30 includes a main visual display screen 34 for observance by the operator 13 after trying on the various glass frames 15 and recording same.

As noted in FIG. 3, the main control panel assembly 18 includes a power supply cord 26 interconnected to a main panel housing member 38 having a monitor control switch assembly 40, a VCR control switch assembly 42, and an instruction indicia 44 thereon.

The monitor control switch assembly 40 includes a primary on/off switch 46 and a volume control switch 48 both operable in a conventional manner.

A VCR control switch assembly 42 is operable in a conventional manner and includes (1) a VCR on/off switch 50; (2) a rewind switch 52; (3) a stop switch 54; (4) a fast forward switch 56; (5) a video play switch 58; (6) a record switch 60; and (7) a pause switch 62. All of the aforementioned switches are operable in a conventional manner known in the prior art which are all found on VCR structures known in the prior art.

The use and operation of the VCR control switches 50, 52, 54, 56, 58, 60, 62 is set forth in the instruction indicia 48 as noted being entitled "Operating Instructions".

The instruction indicia 44 sets forth various steps in operation of the overall equipment such as turning on the power supply through the VCR on/off switch 50 in order to energize the interconnected video taping assembly 14 and the video display assembly 16. The next step would be the operator 13 trying on various glass frames 15 while the VCR equipment is turned to the "on" condition for a taping session through operation of the record switch 60.

After a substantial viewing of the operator 13 trying on various glass frames 15 as noted in FIG. 2 and schematic diagrams (FIGS. 4–6), inclusive, it is obvious that the video taping assembly 14 can be operated through the rewind switch 52 to place the video cassette member 31 to its original position before taping. Thereupon, the operator 13, after placing its own prescription eyeglasses on, can push the play switch 58 in order to view the previously taped images on the video display assembly 16 through the television monitor assembly 30 as will be explained in detail.

The operator booth assembly 20 is operable to provide privacy for a taping session by the operator 13 and includes (1) a main support table 64 mounted on a support floor 66; (2) an operator support chair 68 to receive the operator 13 therein; (3) a front wall member 70; (4) a side wall member 72; (5) a screen wall member 74; (6) a corner area 76; and (7) a display mirror member 78.

The front, side, and screen wall members 70, 72, 74 are operable to achieve privacy to the operator 13 in providing an enclosed area for trying on various glass frames 15. The corner area 76 is operable to receive and support the television monitor assembly 30 in an elevated position for ease of viewing.

The display mirror member 78 may be of a one-way mirror type which allows the video camera assembly 22 to be placed therebehind in order to tape the operator 13 trying on the various glass frames 15 while viewing itself in the display mirror member 78.

The main control panel assembly 18 is positioned so as to be within easy reach of the operator 13 and supported on a top surface of the support table member 64 as noted in FIG. 1.

USE AND OPERATION OF THE INVENTION

In the use and operation of the glass frame viewing assembly 12 of this invention, the main function is to allow the operator 13 to try on numerous types of glass frames 15 in order to make a proper selection thereof. This invention is especially desirable in the case of an operator 13 utilizing prescription eyeglasses and, therefore, not being able to observe and make an immediate decision as to which of the numerous glass frames 15 appear to be most appealing and desirable for the purpose of selection and purchase thereof.

The operator 13 has previously had to rely on the opinion of friends or salespersons as to whether the glass frames 15 are most desirable as, without the operator 13 utilizing its own prescription eyeglasses, could not tell whether the glass frames 15 were appealing and desirable for purchase.

The glass frame viewing assembly 12 of this invention allows the operator 13 to record through a video camera process the mounting of the glass frames 15 on its head portion and recording same for later viewing when the operator 13 is able to utilize its own prescription eyeglasses.

The video taping assembly 14 is operable in a conventional manner through the use of the main control panel assembly 18 to record the glass frames 15 on the head portion of the operator 13 for later viewing. The main control panel assembly 18 has the numerous VCR control switch assembly 42 as noted in FIG. 3 being operable to record the glass frames 15 on the operator 13. The pivotal support chair member 68 allows the operator 13 to try on numerous glass frames 15 in various positions as noted in a front view in FIG. 4 and side views in FIGS. 5 and 6.

After numerous recordings have been made of the glass frames 15 by the operator 13, the operator 13 can then use its own prescription eyeglasses and operate the rewind switch 52 to place the video cassette member 31 in a starting position. Then, the operator 13 can use the play switch 58 and view the previous recording of the glass frames 15 on its head portion through the main display screen 34 of the video display assembly 16 as noted in FIG. 6.

If desired, the operator 13 can use the pause switch 52 in order to view various glass frames 15 in a still image so as to make a proper choice of the one that is the most appealing and desirable to purchase.

The operator booth assembly 20 provides an area of privacy for the operator 13 while trying on the various glass frames 15. the display mirror member 78, which can be a one-way mirror, provides a means of focusing the attention of the operator 13 toward the video taping assembly 14 to achieve proper taping of the operator 13 trying on the numerous glass frames 15 while recording on the video cassette member 31.

In the method of use of the glass frame viewing assembly 12 of this invention, the operator 13 follows the steps of (1) energizing the video taping assembly 14 by pushing the VCR on/off switch 50 to the "on" condition; (2) placing the operator 13 on the operator support chair member 68 in a position so as to be facing the display mirror member 78 as noted in FIGS. 1 and 4; (3) while the video taping assembly 14 is energized, the operator 13 trys on various glass frames 15 and views same in frontal and side view positions as noted in FIGS. 4–6, inclusive; (4) after trying on and recording images with the numerous glass frames 15 on the head portion of the operator 13, the video taping assembly 14 is operated to return the video cassette member 31 to the starting position by operation of the rewind switch 52; (5) the operator 13 uses its own prescription eyeglasses; and (6) the operator 13 then energizes the play switch 58 so as to view the previously recorded images on the television monitor assembly 30 and the main display screen 34.

Therefore, the method of this invention allows the operator 13 to try on numerous glass frames 15 and view same on the main display screen 34 while utilizing the operator's 13 own prescription eyeglasses so as to make an intelligent decision on which of the glass frames 15 would be most desirable for use and purchase.

The glass frame viewing assembly of this invention can be easily set up with the operator booth assembly in a corner location in an optometrist's office or eyeglass frame shop and provides numerous convenient features for the operator in choosing the most desirable glass frame.

While the invention has been described in conjunction with preferred specific embodiments thereof, it will be understood this description is intended to illustrate and not to limit the scope of the invention, which is defined by the following claims:

I claim:

1. A glass frame viewing assembly usable by an operator in selecting eyeglass frames, comprising:
    (a) a video taping assembly including a video camera assembly connected to a video recorder assembly with said video camera assembly positioned to record pictures of a head portion of the operator having glass frames thereon;
    (b) a video display assembly connected to said video taping assembly to display the recorded pictures on a main display screen to be observed by the operator;
    (c) a main control panel assembly connected to said video taping assembly and said video display assembly and positioned adjacent the operator for ease of control in recording pictures, rewinding, and playing the pictures on said main display screen;
    (d) an operator booth assembly having a support table member;
    (e) an operator support chair positioned adjacent to said support table member;
    (f) a display mirror member positioned adjacent said support table member; and
    (g) said display mirror having said video camera assembly positioned on a side opposite the operator and operable to record pictures through said display mirror member while said operator is viewing self in said display mirror member;
    whereby the operator is positioned in said support chair member so as to have himself displayed in said display mirror member for trying on the glass frames and having said video camera assembly operable to record pictures of the operator facing the display mirror member in various positions to adequately display the glass frames being inspected.

2. A glass frame viewing assembly usable by an operator in selecting eyeglass frames, comprising:
    (a) a video taping assembly including a video camera assembly connected to a video recorder assembly with said video camera assembly positioned to record pictures of a head portion of the operator having glass frames thereon;
    (b) a video display assembly connected to said video taping assembly to selectively display the recorded pictures on a television monitor assembly positioned to be readily observed by an operator;
    (c) a main control panel assembly connected to said video taping assembly and said video display assembly and positioned adjacent the operator for ease of control in recording pictures, rewinding, and playing the pictures on said television monitor assembly;

(d) an operator booth assembly having a support table member with said main control panel assembly thereon and an operator support chair member positioned adjacent said said support table member; and (e) said operator booth assembly having a one-way mirror positioned between said video camera assembly and the operator with the operator's image on said one-way mirror and the recorded pictures being taken through said one-way mirror;

whereby the operator can position himself in said support chair member and try on glass frames to be recorded by said video camera assembly and taped on said video recorder assembly and said main control panel assembly is readily operable by the operator in order to record, transfer, and display the pictures for subsequent viewing on said television monitor assembly by the operator who can thereupon utilize its own prescription eyeglasses for ease of selecting the proper glass frames to be purchased.

3. A method of selecting eyeglass frames by an operator utilizing a glass frame viewing assembly of this invention involving the steps of:

(a) positioning the operator in view of a video camera assembly in order to record a head portion of the operator having eyeglass frames thereon;

(b) placing the eyeglasses on the head portion of the operator in order to obtain views of the eyeglasses from different angles;

(c) observing the image of the operator with the eyeglasses on the head portion on a one-way mirror positioned between the video camera assembly and the operator;

(d) recording pictures of the eyeglass frames on the operator with a video camera assembly; taken from one side of the one-way mirror with the operator positioned on an opposite side thereof;

(e) moving the operator seated in an operator support chair so as to obtain pictures of the operator's head portion through said video taping assembly operable to obtain front, side, and peripheral views thereof in order to make a proper choice of the eye glass frames to be purchased by the operator;

(f) operating said video display assembly, said video recorder assembly, and said video camera assembly from a common location with said main control panel assembly; and (g) operating said main control panel assembly so as to rewind a video cassette member on a video recorder assembly and to display the pictures on a video display assembly while the operator is utilizing its own prescription eyeglasses in order to make a proper selection of the eyeglass frames.

4. A glass frame viewing assembly usable by an operator in selecting eyeglass frames, comprising:

(a) a video taping assembly to record pictures of a head portion of the operator having glass frames thereon;

(b) a video display assembly connected to said video taping assembly to display the recorded pictures on a main display screen to be observed by the operator;

(c) a main control panel assembly connected to said video taping assembly and said video display assembly operable to selectively control recording pictures, rewinding, and playing the pictures on said main display screen;

(d) an operator booth assembly having a display mirror member; and (e) said display mirror member having said video camera assembly operable to record pictures through said display mirror member while said operator is viewing self in said display mirror member on a side opposite;

whereby the operator is displayed in said display mirror member for trying on the glass frames and having said video camera assembly operble to record pictures of the operator facing said display mirror member in various positions to adequately display the glass frames being inspected.

5. A glass frame viewing assembly as described in claim 4, wherein:

(a) said main control panel assembly is mounted on a support table member and easily accessible to the operator for controlling said video taping assembly and said video display assembly and selectively trying on the glass frames.

* * * * *